: US009450439B2

United States Patent
Hongo et al.

(10) Patent No.: US 9,450,439 B2
(45) Date of Patent: Sep. 20, 2016

(54) SECONDARY BATTERY SYSTEM AND OPERATING METHOD OF SECONDARY BATTERY

(75) Inventors: Hiroo Hongo, Tokyo (JP); Koji Kudo, Tokyo (JP); Kenichi Ishii, Tokyo (JP); Kenji Kobayashi, Tokyo (JP); Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/237,909

(22) PCT Filed: Jun. 13, 2012

(86) PCT No.: PCT/JP2012/065092
§ 371 (c)(1),
(2), (4) Date: Feb. 10, 2014

(87) PCT Pub. No.: WO2013/038764
PCT Pub. Date: Mar. 21, 2013

(65) Prior Publication Data
US 2014/0197798 A1     Jul. 17, 2014

(30) Foreign Application Priority Data
Sep. 15, 2011   (JP) ................................. 2011-202094

(51) Int. Cl.
*H02J 7/00* (2006.01)
*H01M 10/44* (2006.01)
(Continued)

(52) U.S. Cl.
CPC ............ *H02J 7/0068* (2013.01); *H01M 4/505* (2013.01); *H01M 10/052* (2013.01); *H01M 10/44* (2013.01); *H01M 2010/4271* (2013.01); *Y02E 60/122* (2013.01); *Y02T 10/7011* (2013.01)

(58) Field of Classification Search
CPC .. H02J 7/0068; H01M 4/505; H01M 10/052; H01M 10/44; H01M 2010/4271; Y02T 10/7011; Y02E 60/122
See application file for complete search history.

(56) References Cited

U.S. PATENT DOCUMENTS

| | | | |
|---|---|---|---|
| 2004/0241534 A1 | 12/2004 | Suzuki et al. | |
| 2010/0079111 A1 | 4/2010 | Masuda | |
| 2010/0156352 A1* | 6/2010 | Muta et al. | 320/134 |
| 2011/0171502 A1* | 7/2011 | Kottenstette et al. | 429/49 |

FOREIGN PATENT DOCUMENTS

| | | |
|---|---|---|
| EP | 2 410 602 A1 | 1/2012 |
| JP | 2000-030751 | 1/2000 |

(Continued)

OTHER PUBLICATIONS

International Search Report mailed Aug. 28, 2012.

(Continued)

*Primary Examiner* — Nha Nguyen
(74) *Attorney, Agent, or Firm* — Finnegan, Henderson, Farabow, Garrett & Dunner LLP (57) ABSTRACT

A secondary battery has a progressively deteriorating SOC in which battery performance deteriorates when the secondary battery is stored, and is charged and discharged by a control device. An information processing device stores a preset first threshold smaller than the progressively deteriorating SOC of the secondary battery and a preset second threshold greater than the progressively deteriorating SOC, and separates the range from the minimum SOC to the maximum SOC of the secondary battery into, at least, two regions by setting the section from the first threshold to the second threshold as a boundary to thereby cause the control device to charge or discharge the secondary battery within any of the above regions.

15 Claims, 3 Drawing Sheets

(51) Int. Cl.
  *H01M 4/505* (2010.01)
  *H01M 10/052* (2010.01)
  *H01M 10/42* (2006.01)

(56) References Cited

FOREIGN PATENT DOCUMENTS

| JP | 2001-307781 | 11/2001 |
| JP | 2010-097760 | 4/2010 |
| JP | 2012-143151 | 7/2012 |
| WO | WO 2009/037881 A1 | 3/2009 |
| WO | WO 2011/118294 A1 | 9/2011 |

OTHER PUBLICATIONS

Extended European Search Report mailed on Apr. 14, 2015 by the European Patent Office in counterpart European Patent Application No. 12832386.2.

Office Action mailed on Jul. 12, 2016, by the Japanese Patent Office in counterpart Japanese Patent Application No. 2013-533545.

\* cited by examiner

SECONDARY BATTERY SYSTEM AND OPERATING METHOD OF SECONDARY BATTERY

CROSS-REFERENCE TO RELATED PATENT APPLICATIONS

This application is a National Stage Entry of International Application No. PCT/JP2012/065092, filed Jun. 13, 2012, which claims priority from Japanese Patent Application No. 2011-202094, filed Sep. 15, 2011. The entire contents of the above-referenced applications are expressly incorporated herein by reference.

TECHNICAL FIELD

The present invention relates to a secondary battery system equipped with a secondary battery and an operating method of the secondary battery.

BACKGROUND ART

Since lithium ion secondary batteries that bind and give off lithium ions have advantages such as high energy densities, high operating voltages, and so forth over nickel cadmium (Ni—Cd) batteries and nickel metal hydride (Ni-MH) batteries of the same capacities, they have been widely used for information processing devices and communication devices such as personal computers and mobile phones that require miniaturization and lightweightness.

Moreover, in recent years, lithium ion secondary batteries have been assessed to be usable as power supplies for electric bicycles, hybrid automobiles, and so forth and also they are being introduced as batteries that store electric power generated by renewable power supplies such as solar batteries to realize a low-carbon society that solves global warming problems.

To enable the widespread use of lithium ion secondary batteries for electric power storage and as a high capacity power supply for electric automobiles, it is necessary to reduce the maintenance cost as well as manufacturing cost, thereby to prolong their product life.

Although it is thought that the product life of lithium ion secondary batteries can be extended by re-examining the materials that comprise them and the structure of the batteries, there is a method that can reduce the shortening of their product life cycles that is caused by inappropriate usage of the battery and so forth. For example, Patent Document 1 and Patent Document 2 propose techniques that reduce the shortening of the life cycles of lithium ion secondary batteries by controlling charging and discharging of these batteries.

Patent Document 1 describes that charging and discharging of a lithium ion secondary battery are controlled such that the number of lithium ions that migrate between a positive electrode material and a negative electrode active material, when the lithium ion secondary battery is charged or discharged, is 95% or less of the number of lithium ions that migrate in the reverse direction.

Patent Document 2 describes that charging and discharging of a lithium ion secondary battery are controlled such that the end-of-discharge voltage, when the lithium ion secondary battery is discharged, ranges from 3.2 to 3.1 V and such that the upper limit voltage when the lithium ion secondary battery is charged ranges from 4.0 to 4.5 V.

As positive electrode materials (positive electrode active materials) of lithium ion secondary batteries, compositions using lithium cobalt oxide, lithium manganese oxide, and lithium nickel oxide are known. As negative electrode materials (negative electrode active materials), compositions using graphites and cokes are known.

The applicant of the present patent application discovered that when a manganese lithium ion secondary battery having lithium manganese oxide that is used for the positive electrode material of various types of lithium ion secondary batteries is stored at a particular SOC (State of Charge), the battery performance quickly deteriorates (the battery capacity deteriorates).

In this context, SOC represents the ratio of the capacity of the lithium ion secondary battery to the amount of electric charge. The particular SOC in which the battery performance quickly deteriorates is less than the maximum SOC that is the charging limit point and greater than the minimum SOC that is the discharging limit point, for example SOC=40%. In addition, "store" in the specification of the present patent application denotes that a lithium ion secondary battery is kept in the state of a particular voltage of the SOC.

The phenomenon in which the battery performance deteriorates in the particular SOC is not significantly related to a case in which the lithium ion secondary battery is stored in the fully charged state, for example, when it is used for a UPS (Uninterruptable Power Supply).

However, in an application where a lithium ion secondary battery is stored at any SOC between the maximum SOC and the minimum SOC, for example, in an application where electric power generated by the above-described renewable power supply is stored, the lithium ion secondary battery can be understood as being kept in the above-described particular SOC. In such a case, the battery performance of the lithium ion secondary battery will quickly deteriorate.

RELATED ART DOCUMENTS

Patent Documents

Patent Document 1: Japanese Patent Laid-Open No. 2000-030751

Patent Document 2: Japanese Patent Laid-Open No. 2001-307781

SUMMARY

It is therefore an exemplary object of the present invention to provide a secondary battery system and an operating method of the secondary battery that can reduce a shortening of the product life of a secondary battery when it is stored.

In order to achieve the above object, the secondary battery system of an exemplary aspect of the present invention is a secondary battery system including a secondary battery having a progressively deteriorating SOC in which battery performance deteriorates when the secondary battery is stored, and includes:

a control device that, while detecting the SOC of the secondary battery, charges the secondary battery with electric power from an electric power source and supplies the electric power discharged from the secondary battery to a load; and, an information processing device that stores a preset first threshold smaller than the progressively deteriorating SOC of the secondary battery and a preset second threshold greater than the progressively deteriorating SOC, and separates the range from the minimum SOC to the maximum SOC of the secondary battery into, at least, two regions by setting the section from the first threshold to the second threshold as a boundary to thereby cause the control device to charge or discharge the secondary battery within any of the above regions.

The operating method of a secondary battery of an exemplary aspect of the present invention is an operating method of a secondary battery having a progressively deteriorating SOC in which battery performance deteriorates when the secondary battery is stored, the method comprising:

providing a control device that, while detecting the SOC of the secondary battery, charges the secondary battery with electric power from an electric power source and supplies the electric power discharged from the secondary battery to a load;

a computer storing a preset first threshold smaller than the progressively deteriorating SOC of the secondary battery and a preset second threshold greater than the progressively deteriorating SOC, and separating the range from the minimum SOC to the maximum SOC of the secondary battery into, at least, two regions by setting the section from the first threshold to the second threshold as a boundary; and the computer causing the control device to charge or discharge the secondary battery within any of the above regions.

EXEMPLARY EMBODIMENT

Next, the present invention will be described with reference to the drawings.

Figure 1:
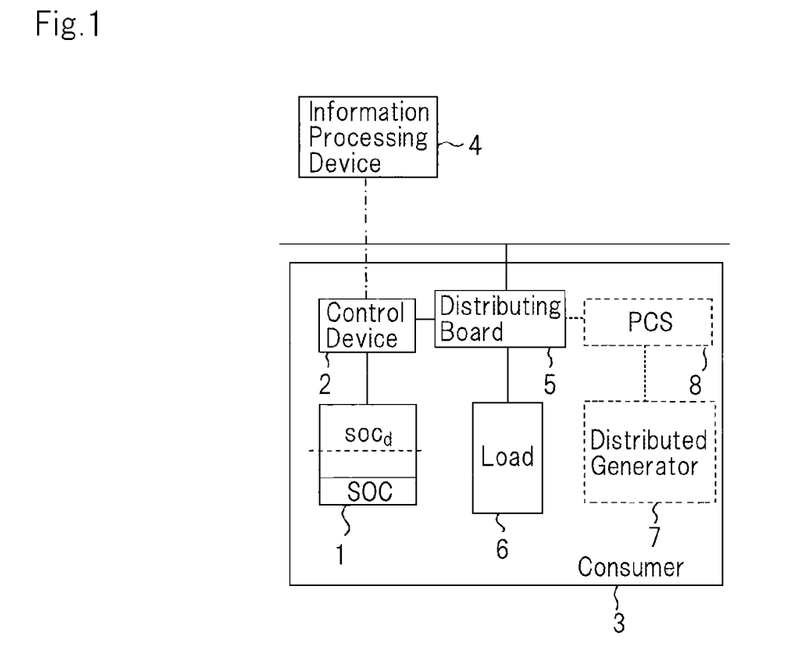
FIG. 1 is a block diagram showing one configurational example of a secondary battery system of the present invention.
Figure 2:
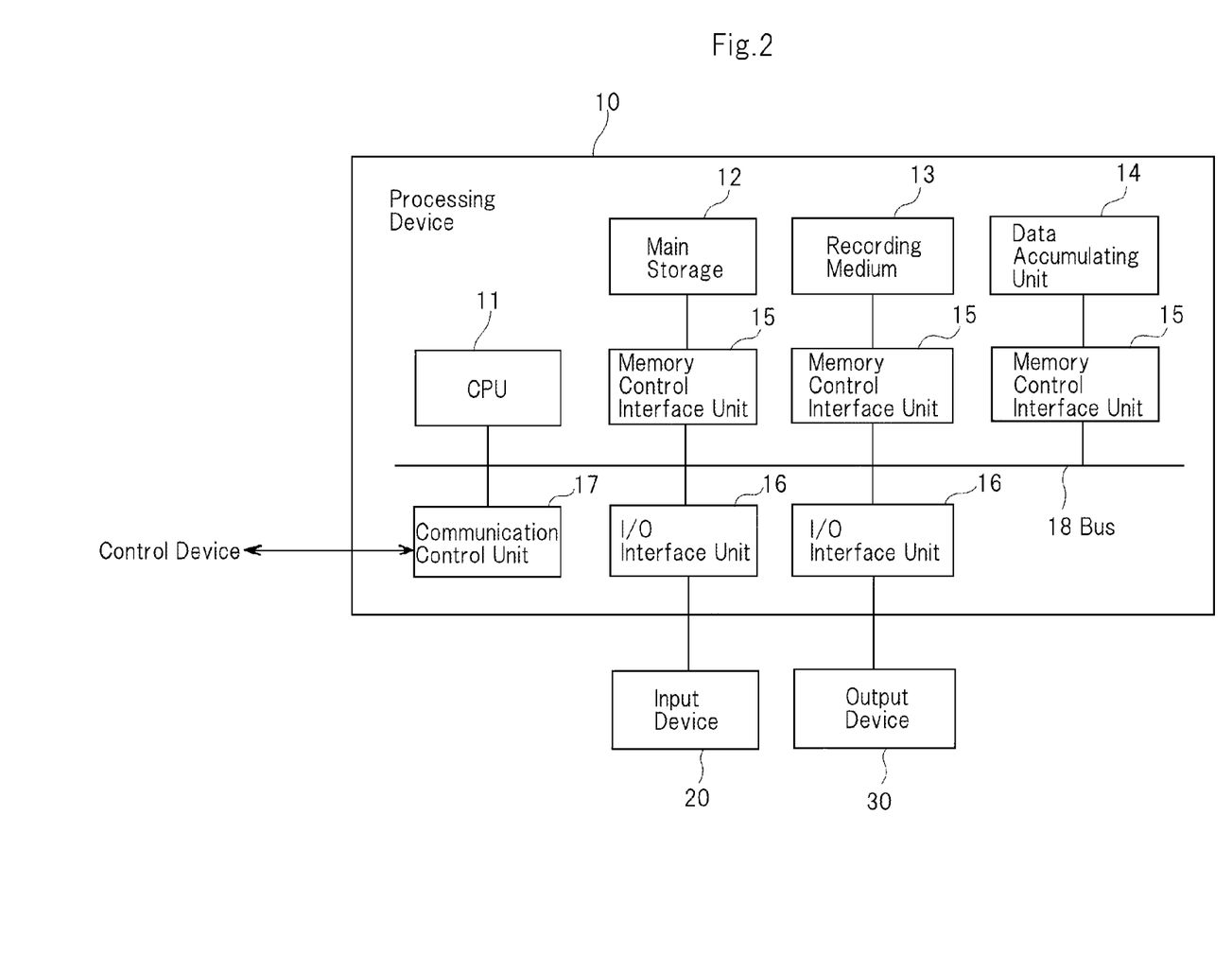
FIG. 2 is a block diagram showing one configurational example of an information processing device shown in FIG. 1.

FIG. 1 is a block diagram showing one configurational example of a secondary battery system of the present invention. FIG. 2 is a block diagram showing one configurational example of an information processing device shown in FIG. 1.

As shown in FIG. 1, the secondary battery system of the present invention is composed of an electric power user, called consumer, including lithium-ion secondary battery (which will be simply referred to hereinbelow as "secondary battery") 1 and control device 2 for charging and discharging the secondary battery 1, and information processing device 4 that implements the aftermentioned operating method of the secondary battery by controlling control device 2 of consumer 3.

Consumer 3 is an electric power user (factory, building, facility, residence and so forth) including load 6 such as various kinds of electric devices, a heat pump hot water supplier and so forth, which consume electric power supplied from the electric power system and secondary battery 1. Load 6 shown in FIG. 1 stands for many loads of consumer 3, en bloc. Secondary battery 1 is connected to the electric power system via control device 2 and distributing board 5 provided for consumer 3. Consumer 3 may include distributed generator 7 such as the aforementioned renewable power source, fuel battery, in-house power generation, and gas cogeneration system. In this case, distributed generator 7 is connected to the electric power system via PCS (Power Control System) 8 for the distributed generator 7 and distributing board 5.

Information processing device 4 and control device 2 of consumer 3 are connected so as to be able to exchange information, commands and so forth via a well-known communication means. As the communication means, a well-known wireless communication means may be used, or a well-known wired communication means may be used. As the wireless communication means, for example the well-known Zigbee wireless scheme using a radio frequency band of 950 MHz or the like may be used. As the wired communication means, for example the well-known PLC (Power Line Communication) scheme that exchanges information using distribution lines (power lines) or the like may be considered.

Though FIG. 1 shows a configurational example in which secondary battery 1 of a single consumer 3 connected to the electric power system is controlled by information processing device 4 via control device 2, information processing device 4 may handle a plurality of consumers 3 including control device 2 and secondary battery 1 as its control target. Further, these consumers 3 may be connected near to the electric power system, or may be connected to the electric power system in a distant area.

Secondary battery 1 is supplied with electric power required for charging, from the electric power system or distributed generator 7 and used to level the peak demand for the electric power system, for instance. As secondary battery 1, for example, a manganese lithium ion secondary battery is used. Manganese lithium ion secondary batteries are batteries whose positive electrode materials are mainly lithium manganese oxide ($Li_xMn_yO_z$: x is around 1 or around 0.65 or around 0.1 to 0.5; y is around 2; z is around 4). However, the compositional ratio of Li, Mn, and O is not limited to those values. In addition, the positive electrode material may contain various types of substances such as Al, Mg, Cr, Fe, Co, Ni and Cu as long as the positive electrode material is mainly lithium manganese oxide. The present invention, which is not limited to a manganese lithium ion secondary battery, can be applied to any secondary battery provided that its performance quickly deteriorates when it is stored at a particular SOC.

The broken line on secondary battery 1 shown in FIG. 1 indicates the particular SOC (which will be referred to hereinbelow as progressively deteriorating $SOC_d$) in which the performance of secondary battery 1 quickly deteriorates when it is stored. Further, the solid line on secondary battery 1 shown in FIG. 1 schematically indicates the stored amount of electricity (SOC) relative to the capacity of secondary battery 1.

Though FIG. 1 shows an example in which consumer 3 includes one secondary battery 1, the number of secondary batteries provided for consumer 3 is not limited to one as long as secondary batteries 1 can be charged and discharged separately under control of control device 2. Secondary batteries 1 may be battery packs which are each composed of multiple secondary battery cells accommodated in one package so that each battery pack can be charged and discharged as a unit, or each cell can be charged and discharged individually as a unit.

Control device 2 can be implemented by a PCS (Power Control System) or the like which includes: a well-known charging device and protection device which is manufactured in conformity with the performance and properties of secondary battery 1 and offered by the manufacturer or the seller of secondary battery 1; and a well-known bidirectional inverter that can change the AC power supplied from the electric power system to DC power stored in secondary battery 1 and change the DC power discharged from secondary battery 1 to AC power that is compatible with the electric power system. Further, control device 2 includes a communication means for exchanging information with information processing device 4 shown in FIG. 1 and charges and discharges secondary battery 1 in accordance with instructions from information processing device 4.

In general, the protection device detects the SOC of secondary battery 1 and the value of the input/output current of secondary battery 1, and the charging device switches the charging current (fixed current) and charging voltage (fixed voltage) based on the SOC and current value detected by the protection device. Usually, the SOC of secondary battery 1 corresponds approximately one to one with the output voltage, so that control device 2 may detect the value of output voltage from secondary battery 1 instead of the SOC. When the SOC of secondary battery 1 that is detected by control device 2 is given in analog value, control device 2 may include an A/D converter for converting the SOC value to a digital value.

Information processing device 4 receives the SOC value of each secondary battery 1 transmitted from control device 2 at the time of charging and discharging of secondary battery 1, and transmits instructions to control device 2 of each consumer 3 based on the received SOC value to thereby control charging and discharging of secondary battery 1. Information processing device 4 can be implemented by a computer shown in FIG. 2, for example.

The computer shown in FIG. 2 includes processing device 10 for executing a predetermined process in accordance with a program, input device 20 for inputting commands, information and so forth to processing device 10 and output device 30 for outputting the processing result of processing device 10.

Processing device 10 includes CPU 11, main storage 12 for temporarily storing information required for the processing of CPU 11, recording medium 13 with programs for executing the process of the present invention recorded thereon, data accumulating unit 14 in which the rated capacity of secondary battery 1, the maximum SOC, the minimum SOC, the aftermentioned first threshold $SOC_L$ and second threshold $SOC_U$ and other values are stored, memory control interface unit 15 for controlling data transmission between main storage 12, recording medium 13 and data accumulating unit 14, I/O interface unit 16 as an interface device for input device 20 and output device 30, and communication control unit 17 for exchanging information and commands with each control device 2, these components being connected by bus 18.

Processing device 10 executes the aftermentioned processing in accordance with the programs recorded in storing medium 13 to thereby control charging and discharging of secondary battery 1 provided for consumer 3 via control device 2. Here, recording medium 13 may be a magnetic disk, semiconductor memory, optical disk or any other recording medium. Further, data accumulating unit 14 need not be provided inside processing device 10 but may be provided as an independent device.

Next, the operating method of the secondary battery of the present invention will be described.

Figure 3:
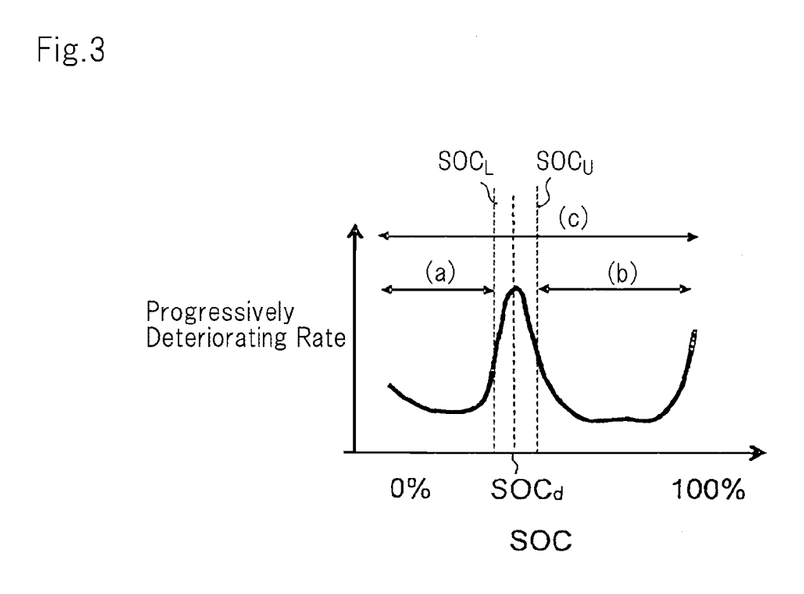
FIG. 3 is a graph showing an example of the relationship between the SOC and the progressively deteriorating rate of the battery performance when a secondary battery is stored.

FIG. 3 is a graph showing an example of the relationship between the SOC and the progressively deteriorating rate of the battery performance when a secondary battery is stored.

As described above, for example, when a manganese lithium ion secondary battery is stored in progressively deteriorating $SOC_d$, the battery performance deteriorates (the battery capacity lowers) quickly. FIG. 3 shows that the deteriorating rate of the battery performance becomes maximum at $SOC_d$ over the range from the minimum SOC (0%) to the maximum SOC (100%).

In the present invention, in order to prevent the progressively deteriorating $SOC_d$ from deteriorating during charging and discharging of secondary battery 1, the range from the minimum SOC to the maximum SOC of the secondary battery 1 is separated by setting a boundary at progressively deteriorating $SOC_d$ into two regions and the secondary battery 1 is used for only one of the two regions. However, if the total range is divided by setting progressively deteriorating $SOC_d$ as a boundary, there is a fear that the SOC will reach a progressively deteriorating $SOC_d$ during the operation of secondary battery 1. To avoid this, first threshold $SOC_L$ that is smaller than the progressively deteriorating $SOC_d$ of secondary battery 1 and second threshold SOC that is greater than the progressively deteriorating $SOC_d$ are set up beforehand, and the total range is separated into two regions by setting the section between first threshold $SOC_L$ and second threshold $SOC_U$ as a boundary. For the case of secondary battery 1 shown in FIG. 1, the battery will be used in either the region from the minimum SOC to first threshold $SOC_L$ (region (a) in FIG. 3) or the region from second threshold $SOC_U$ to the maximum SOC (region (b) in FIG. 3).

First threshold $SOC_L$ and second threshold $SOC_U$ should be set corresponding to progressively deteriorating $SOC_d$ by the manufacturer, seller or user of secondary battery 1. First threshold $SOC_L$ and second threshold $SOC_U$ for each secondary battery 1 may be transmitted from, for example control device 2 to information processing device 4, to thereby be stored in data accumulating unit 14 of the information processing device 4.

Information processing device 4 monitors the SOC value of secondary battery 1 transmitted from control device 2. When the SOC reaches first threshold $SOC_L$ (or the maximum SOC) at the time of charging secondary battery 1, the information processing device makes control device 2 stop the charging operation of the secondary battery 1, or switch the secondary battery 1 into a discharging operation.

On the other hand, when the SOC reaches second threshold $SOC_U$ (or the minimum SOC) at the time of discharging secondary battery 1, the information processing device makes control device 2 stop the discharging operation of the secondary battery 1, or switch the secondary battery 1 into a charging operation using power from the distribution system, for example.

By the way, when the range from the minimum SOC to the maximum SOC of secondary battery 1 is separated into two regions so as to use only one of the regions, the apparent usable battery capacity of the secondary battery 1 becomes lower.

To deal with this, when full use of the battery capacity is desired, that is, when the range from the minimum SOC to the maximum SOC of secondary battery 1 is used (the region (c) in FIG. 3), control should be carried out without stopping the charging operation or the discharging operation at progressively deteriorating $SOC_d$.

For this purpose, information processing device 4 may and should make control device 2 continue charging from first threshold $SOC_L$ to second threshold $SOC_U$ in the charging mode of secondary battery 1, whereas device 4 may and should make control device 2 continue discharging from second threshold $SOC_U$ to first threshold $SOC_L$ in the discharging mode of secondary battery 1.

For example, when secondary battery 1 is charged with electric power generated by a renewable power source such as a solar battery or the like, if the value of the SOC of secondary battery 1 is the progressively deteriorating $SOC_d$, it is likely that the electric power of the renewable power supply will stop and thereby the charging operation will stop. In such a case, information processing device 4 may and should make control device 2 continue charging secondary battery 1 using the power supplied from the electric power system. When secondary battery 1 is charged by the electric power supplied only from the electric power system, the operation control needs to be scheduled so that charging will not stop between first threshold $SOC_L$ and second threshold $SOC_U$.

On the other hand, when secondary battery 1 is discharged, since the operations of all electric devices as loads 6 of consumer 3 stop, the likelihood that the discharging operation will stop when the value of the SOC of secondary battery 1 is the progressively deteriorating $SOC_d$ cannot be denied. In such a case, information processing device 4 may and should operate the above-described heat pump hot water supplier installed at consumer 3 so as to continue the discharging operation of secondary battery 1. A secondary battery that is being charged is equivalent to an electric device that is consuming electric power viewed from other secondary batteries. Thus, if there is a secondary battery that is not contained in the charging and discharging system of this exemplary embodiment (external secondary battery), the discharging operation for secondary battery 1 can be continued such that the external secondary battery is charged. Alternatively, an internal load that consumes power may be provided inside secondary battery 1. That is, when the discharging operation of secondary battery 1 stops in progressively deteriorating $SOC_d$, the internal load is connected between the positive and negative terminals of secondary battery 1 so as to continue the discharging operation of secondary battery 1.

The water heater, external secondary battery and internal load may and should be connected to information processing device 4 via a communication means so as to be able control them in accordance with instructions from information processing device 4. As this communication means, a well-known wireless communication means may be used or a well-known wired communication means may be used.

Further, it is also possible in the present invention to increase the charging speed during the period in which the battery is being charged from first threshold $SOC_L$ to second threshold $SOC_U$, by increasing the charging current or charging voltage within the permissible range of secondary battery 1. Similarly, it is also possible to increase the discharging speed during the period in which the battery is being discharged from second threshold $SOC_U$ to first threshold $SOC_L$ by increasing the current flowing through load 6 within the permissible range of secondary battery 1. The charging current or the charging voltage can be controlled by a charging device provided in aforementioned charging device 2 manufactured in conformity with the performance and properties of secondary battery 1. The method of increasing the load current may be conceivably implemented by operating the heat pump hot water supplier or by charging an external secondary battery.

Though the above description was described by giving an example in which secondary battery 1 has one progressively deteriorating $SOC_d$, if secondary battery 1 has a multiple number of progressively deteriorating $SOC_d$, the range from the minimum SOC to the maximum SOC may be separated into multiple regions in accordance with the number of progressively deteriorating $SOC_d$ so as to use one of the regions as a secondary battery. Also in this case, first threshold $SOC_L$ and second threshold $SOC_U$ may be set for each of multiple progressively deteriorating $SOC_d$, in the same manner as above.

Further, though the above description was made by giving an example in which the progressively deteriorating $SOC_d$ of each secondary battery 1 is constant, the progressively deteriorating $SOC_d$ may vary depending on the hours of operation and the number of times of charging and discharging of secondary battery 1. Accordingly, first threshold $SOC_L$ and second threshold $SOC_U$ may be modified depending on the hours of operation and the number of times of charging and discharging.

According to the present invention, the range from the minimum SOC to the maximum SOC of secondary battery 1 is separated into multiple regions by setting the section between first threshold $SOC_L$ and second threshold $SOC_U$ as a boundary so as to use the secondary battery in only any of the above regions, whereby no charging operation or discharging operation will stop in progressively deteriorating $SOC_d$ of secondary battery 1. As a result, it is possible to prevent shortening of the product life of secondary battery 1 when secondary battery 1 is stored.

Further, when full use of the battery capacity is desired, control device 2 is made to continue charging from first threshold $SOC_L$ to second threshold $SOC_U$ at the time of charging secondary battery 1, whereas the control device is made to continue discharging from second threshold $SOC_U$ to first threshold $SOC_L$, whereby no charging operation or discharging operation will stop in progressively deteriorating $SOC_d$ of secondary battery 1. In particular, since increase the charging and discharging speed between first threshold $SOC_L$ and second threshold $SOC_U$ shortens the period in which the value of SOC of secondary battery 1 is present around progressively deteriorating $SOC_d$, it is hence possible to reduce the risk of stopping the charging operation and the discharging operation in progressively deteriorating $SOC_d$.

Although the present invention has been explained with reference to the exemplary embodiment, the present invention should not be limited to the above exemplary embodiment of the invention. Various modifications that can be understood by those skilled in the art may be made to the structures and details of the present invention within the scope of the present invention.

This application claims priority from Japanese Patent Application No. 2011-202094, filed on Sep. 15, 2011, which is hereby incorporated by reference in its entirety.

The invention claimed is:

1. A secondary battery system including a secondary battery having a progressively deteriorating SOC in which battery performance deteriorates when the secondary battery is stored, comprising:
   a control device that detects the SOC of said secondary battery, charges said secondary battery with electric power from an electric power source and supplies the electric power discharged from said secondary battery to a load; and
   an information processing device that stores a preset first threshold lower than said progressively deteriorating SOC of said secondary battery and greater than a minimum SOC, that stores a preset second threshold greater than said progressively deteriorating SOC and lower than maximum SOC, and that causes said control device to charge or discharge said secondary battery within a region from the minimum SOC to said first threshold or to within a region from said second threshold SOC to the maximum SOC;

wherein when said secondary battery is used in the range from said minimum SOC to said maximum SOC, said information processing device causes said control device to continue charging said secondary battery from said first threshold to said second threshold at the time of charging the secondary battery, and to continue discharging said secondary battery from said second threshold to said first threshold at the time of discharging said secondary battery; and wherein the charging operation of said secondary battery does not stop between said first threshold and said second threshold and the discharging operation of said secondary battery does not stop between said second threshold and said first threshold.

2. The secondary battery system according to claim 1, wherein said information processing device also includes a communication means that sends an instruction for controlling the operation of said load, wherein:

said information processing device, when said secondary battery is charged, causes said control device to continue supplying electric power to said secondary battery from a distributed generator or an electric power system which is said electric power source such that the charging operation of said secondary battery does not stop between said first threshold and said second threshold.

3. The secondary battery system according to claim 1, wherein said information processing device controls said control device or load such that charging current, charging voltage or discharging current of said secondary battery between said first threshold and said second threshold is larger than the charging current, charging voltage or discharging current of said secondary battery in other regions between said first threshold and said second threshold.

4. The secondary battery system according to claim 1, wherein said positive electrode material of said lithium ion secondary battery is mainly lithium manganese oxide.

5. The secondary battery system according to claim 1, wherein when the SOC of said secondary battery reaches said first threshold or the maximum SOC, said information processing device causes said control device to stop charging said secondary battery or switch said secondary battery to discharging during charging of said secondary battery; and when the SOC of said secondary battery reaches said second threshold or the minimum SOC, said information processing device causes said control device to stop discharging said secondary battery or switch said secondary battery to charging during discharging of said secondary battery.

6. An operating method of a secondary battery having a progressively deteriorating SOC in which battery performance deteriorates when the secondary battery is stored, the method comprising the steps of:

charging, by a control device while detecting the SOC of said secondary battery, said secondary battery with electric power from an electric power source, and supplying the electric power discharged from said secondary battery to a load;

causing a computer to store a preset first threshold lower than said progressively deteriorating SOC of said secondary battery and greater than minimum SOC, causing a computer to store a preset second threshold greater than said progressively deteriorating SOC and lower than a maximum SOC; and causing said control device to charge or discharge said secondary battery within a region from the minimum SOC to said first threshold or to within a region from said second threshold SOC to the maximum SOC;

wherein when said secondary battery is used in the range from said minimum SOC to said maximum SOC, causing said control device to continue charging said secondary battery from said first threshold to said second threshold at the time of charging said secondary battery and to continue discharging said secondary battery from said second threshold to said first threshold at the time of discharging said secondary battery; and wherein the charging operation of said secondary battery does not stop between said first threshold and said second threshold and the discharging operation of said secondary battery does not stop between said second threshold and said first threshold.

7. The operating method of a secondary battery according to claim 6, further comprising:

sending an instruction for controlling the operation of said load from said computer to said load, causing said control device to continue supplying electric power to said secondary battery from a distributed generator or an electric power system which is said electric power source such that charging operation of said secondary battery does not stop between said first threshold and said second threshold, when said secondary battery is charged, causing said control device to continue the discharging operation of said secondary battery by operating said load such that the discharging operation of said secondary battery does not stop between said second threshold and said first threshold, when said secondary battery is discharged.

8. The operating method of a secondary battery according to claim 6, further comprising:

causing said computer to control said control device or load such that charging current, charging voltage or discharging current of said secondary battery between said first threshold and said second threshold is larger than charging current, charging voltage or discharging current of said secondary battery in other regions between said first threshold and said second threshold.

9. The operating method of a secondary battery according to claim 6, wherein said positive electrode material of said lithium ion secondary batteries is mainly lithium manganese oxide.

10. The method according to claim 6, further comprising the steps of:

causing the control device to stop charging said secondary battery when the SOC of said secondary battery reaches said first threshold or the maximum SOC or switching said secondary battery to discharging during charging of said secondary battery; and causing the control device to stop discharging said secondary battery when the SOC of said secondary battery reaches said second threshold or the minimum SOC or switching said secondary battery to charging during discharging of said secondary battery.

11. An information processing apparatus for controlling a secondary battery having a progressively deteriorating SOC in which battery performance deteriorates when the secondary battery is stored, comprising:
- a storing device storing a preset first threshold lower than said progressively deteriorating SOC of said secondary battery and greater than a minimum SOC, and storing a preset second threshold greater than said progressively deteriorating SOC and lower than a maximum SOC; and
- a processing device configured to cause a control device to charge or discharge said secondary battery to within a region from the minimum SOC to said first threshold or to within a region from said second threshold SOC to the maximum SOC;
- wherein when said secondary battery is used in the range from said minimum SOC to said maximum SOC, said processing device causes said control device to continue charging said secondary battery from said first threshold to said second threshold at the time of charging said secondary battery, and to continue discharging said secondary battery from said second threshold to said first threshold at the time of discharging said secondary battery and wherein the charging operation of said secondary battery does not stop between said first threshold and said second threshold and the discharging operation of said secondary battery does not stop between said second threshold and said first threshold.

12. The information processing apparatus according to claim 11, further comprising a communication means that sends an instruction for controlling the operation of said load, wherein:
- said processing device, when said secondary battery is charged, causes said control device to continue supplying electric power to said secondary battery from a distributed generator or an electric power system which is said electric power source such that the charging operation of said secondary battery does not stop between said first threshold and said second threshold,
- said processing device, when said secondary battery is discharged, causes said control device to continue the discharging operation of said secondary battery by operating said load such that the discharging operation of said secondary battery does not stop between said second threshold and said first threshold.

13. The information processing apparatus according to claim 11, wherein
- said processing device controls said control device or load such that charging current, charging voltage or discharging current of said secondary battery between said first threshold and said second threshold is larger than charging current, charging voltage or discharging current of said secondary battery in other regions between said first threshold and said second threshold.

14. The information processing apparatus according to claim 11, wherein said positive electrode material of said lithium ion secondary batteries is mainly lithium manganese oxide.

15. The information processing apparatus according to claim 11, wherein, when the SOC of said secondary battery reaches said first threshold or the maximum SOC, said processing device causes said control device to stop charging said secondary battery or switch said secondary battery to discharging during charging of said secondary battery; and
- when the SOC of said secondary battery reaches said second threshold or the minimum SOC, said processing device causes said control device to stop discharging said secondary battery or switch said secondary battery to charging during discharging of said secondary battery.

* * * * *